United States Patent
Shaltiel et al.

(10) Patent No.: US 9,402,170 B1
(45) Date of Patent: Jul. 26, 2016

(54) METHOD AND SYSTEM FOR PROVIDING INFORMATIVE INCOMING CALL ALERTS

(71) Applicant: VONAGE NETWORK LLC, Holmdel, NJ (US)

(72) Inventors: Natan Shaltiel, Tel-Aviv (IL); May Ben Arie, Raanana (IL)

(73) Assignee: Vonage Business Inc., Atlanta, GA (US)

( * ) Notice: Subject to any disclaimer, the term of this patent is extended or adjusted under 35 U.S.C. 154(b) by 0 days.

(21) Appl. No.: 14/608,273

(22) Filed: Jan. 29, 2015

(51) Int. Cl.
| | | |
|---|---|---|
| *H04M 1/725* | (2006.01) | |
| *H04W 4/00* | (2009.01) | |
| *H04W 4/12* | (2009.01) | |
| *H04W 4/16* | (2009.01) | |
| *H04L 29/06* | (2006.01) | |
| *H04M 7/12* | (2006.01) | |

(52) U.S. Cl.
CPC .............. *H04W 4/12* (2013.01); *H04L 65/1006* (2013.01); *H04L 65/1076* (2013.01); *H04M 1/72552* (2013.01); *H04M 1/72563* (2013.01); *H04M 7/1295* (2013.01); *H04W 4/16* (2013.01)

(58) Field of Classification Search
CPC ................................ H04W 76/00; H04W 4/12
USPC ............ 455/412.2, 422.1; 709/227, 202, 220; 379/207.11, 211.01, 265.02
See application file for complete search history.

(56) References Cited

U.S. PATENT DOCUMENTS

| | | | | |
|---|---|---|---|---|
| 5,673,299 A * | 9/1997 | Fuller | ................... | H04M 1/006 379/207.11 |
| 5,742,905 A * | 4/1998 | Pepe | ....................... | H04L 12/58 379/211.01 |
| 5,999,965 A * | 12/1999 | Kelly | ..................... | H04M 3/523 709/202 |
| 6,014,439 A * | 1/2000 | Walker | .................. | H04M 3/428 379/265.02 |
| 6,161,134 A * | 12/2000 | Wang | .................... | G06F 1/1632 709/220 |
| 6,178,240 B1 * | 1/2001 | Walker | .................. | H04M 3/428 379/265.01 |
| 6,185,283 B1 * | 2/2001 | Fuller | ................... | H04M 1/006 379/211.02 |
| 6,301,354 B1 * | 10/2001 | Walker | .................. | H04M 3/428 379/265.02 |
| 6,374,102 B1 * | 4/2002 | Brachman | ............. | H04W 76/00 455/422.1 |
| 6,883,023 B1 * | 4/2005 | Wang | .................... | G06F 1/1632 709/220 |
| 9,071,945 B1 * | 6/2015 | Rubin | ..................... | H04W 4/12 |
| 2003/0005126 A1 * | 1/2003 | Schwartz | ................ | H04L 29/06 709/227 |
| 2003/0039339 A1 * | 2/2003 | Luehrig | ............. | G06Q 30/0258 379/88.13 |
| 2003/0156690 A1 * | 8/2003 | Crockett | .................. | H04L 12/66 379/93.23 |
| 2015/0172439 A1 * | 6/2015 | Yagey | ..................... | H04W 4/12 455/412.2 |

* cited by examiner

*Primary Examiner* — William D Cumming

(74) *Attorney, Agent, or Firm* — Moser Taboada; Joseph Pagnotta

(57) ABSTRACT

A method and apparatus for providing informative incoming call alerts are provided herein. The method includes receiving an incoming call from a second device; transmitting, to the second device, a first message regarding the incoming call; receiving, from the second device, a second message responsive to the first message regarding the incoming call; receiving a selection of one of a plurality of options based on the received second message; and processing the selected option.

17 Claims, 8 Drawing Sheets

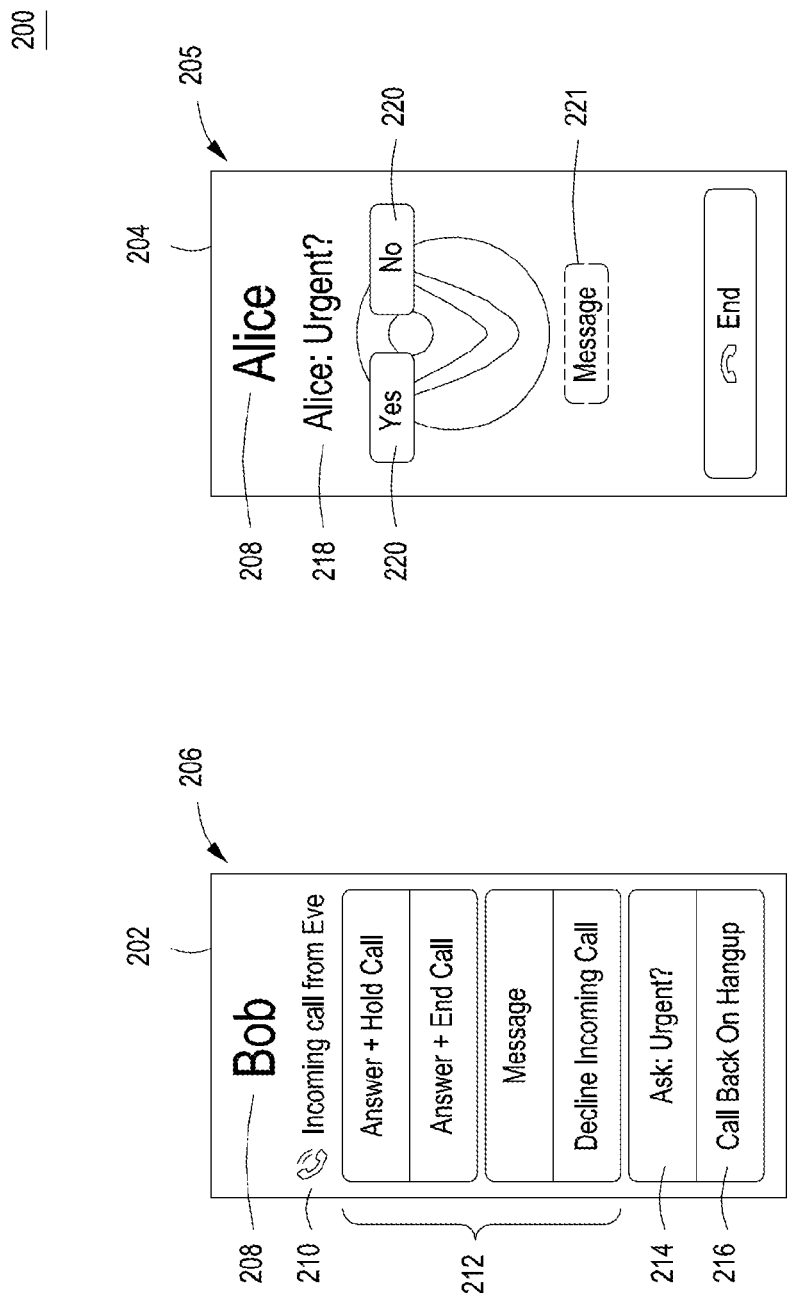

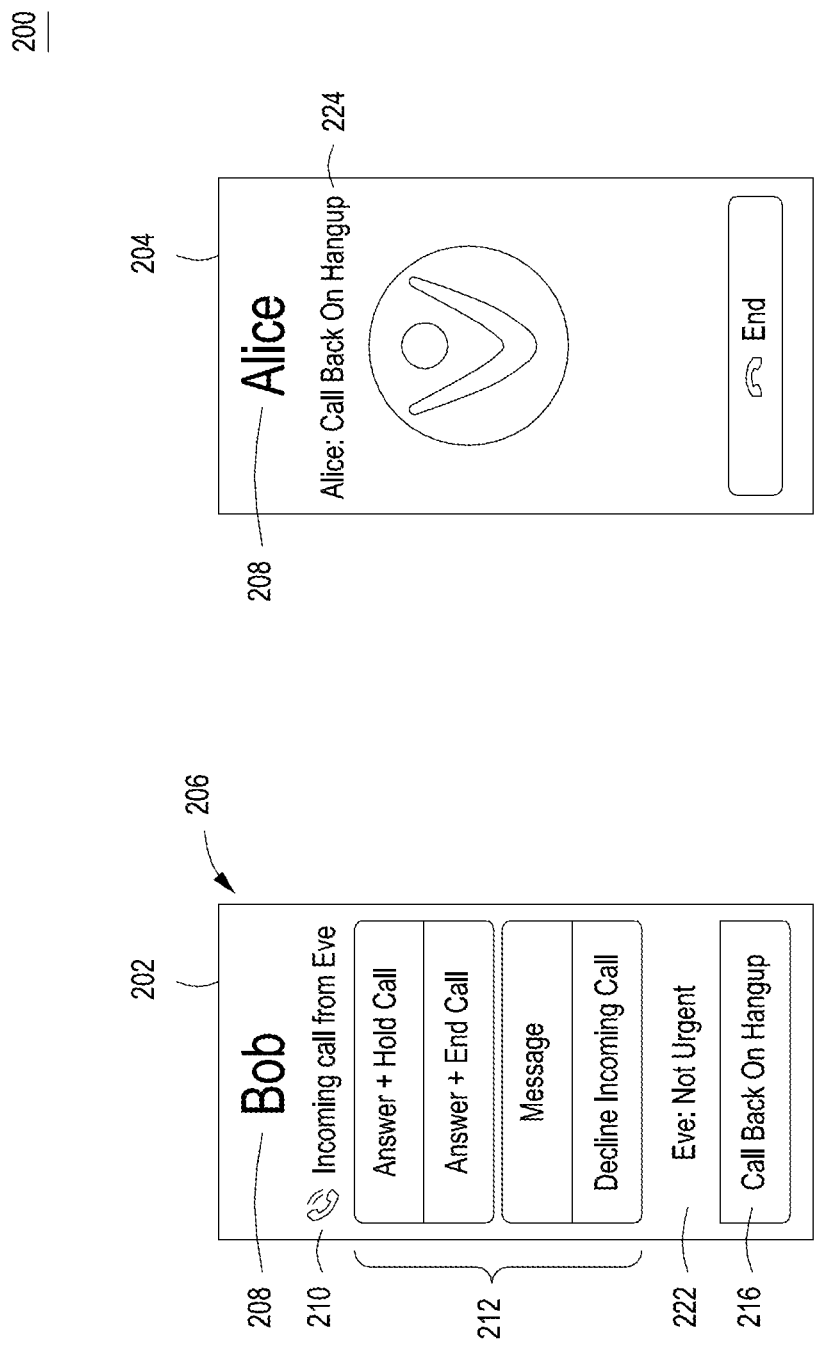

METHOD AND SYSTEM FOR PROVIDING INFORMATIVE INCOMING CALL ALERTS

BACKGROUND

1. Field

Embodiments of the present invention generally relate to methods and systems for providing informative incoming call alerts.

2. Description of the Related Art

Call waiting is a telephony feature offered by many telephony service providers. Typically, when a first user is on a call with a second user, and a third party calls the first user; the first user sees a caller identifier of the third party and is provided with a number of options. Based on the caller identifier, the first user may for example, accept the call and end the current call or put the current call on hold, or the first user may opt to ignore the call from the third party. However, the first user may be ignoring an urgent incoming call from the third party, or may end an important call with the second user only to learn that the incoming call from the third party is not important. It would be helpful for the first user to have additional information about the incoming call in order to make a decision regarding what course of action to take.

Therefore, there exists a need in the art for a method and system for interactive call waiting.

SUMMARY

A method and system for providing informative incoming call alerts are provided herein. In some embodiments, a method for providing informative incoming call alerts may include receiving an incoming call from a second device; transmitting, to the second device, a first message regarding the incoming call; receiving, from the second device, a second message responsive to the first message regarding the incoming call; receiving a selection of one of a plurality of options based on the received second message; and processing the selected option.

In some embodiments, a system for providing informative incoming call alerts may include a call waiting module configured to: receive an incoming call from a second device; transmit, to the second device, a first message regarding the incoming call; receive, from the second device, a second message responsive to the first message regarding the incoming call; receive a selection of one of a plurality of options based on the received second message; and process the selected option.

A method and system for displaying incoming messages received during a telecommunication session are provided herein. In some embodiments, a method for displaying incoming messages received during a telecommunication session may include intercepting an incoming message; extracting a caller identifier from the incoming message; and displaying the incoming message when it is determined that the caller identifier from the incoming message matches a caller identifier of a user taking part in the telecommunication session.

Other and further embodiments of the present invention are described below.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 2A-2D illustrate graphical user interfaces for providing informative incoming call alerts, according to one or more embodiments of the invention;

Figure 1:
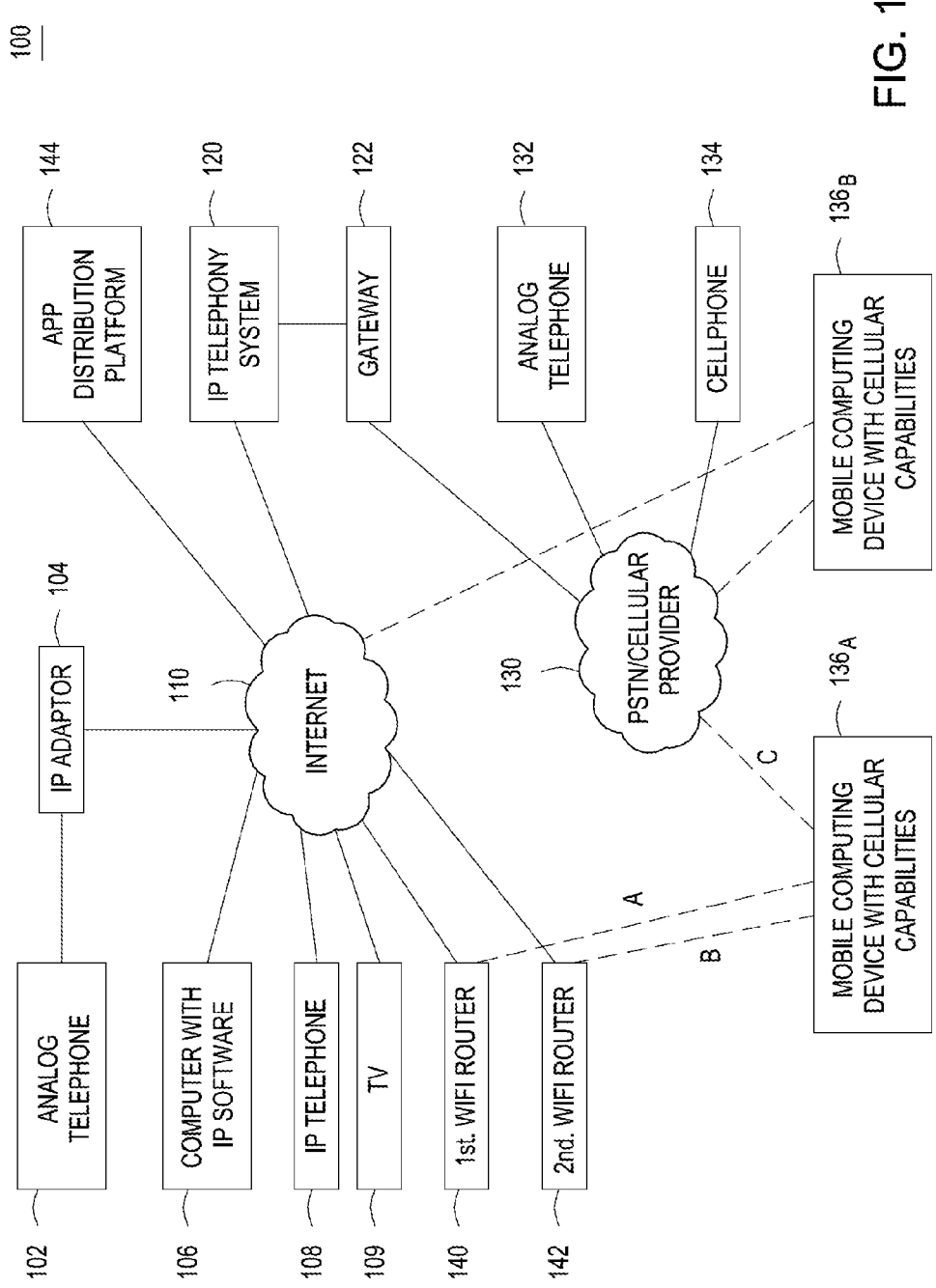
FIG. 1 depicts a block diagram of a telecommunication network, according to one or more embodiments of the invention.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present invention generally relate to a method and apparatus for providing informative incoming call alerts. In some embodiments, when a third party caller calls a user who is currently in a telecommunication session, the user is notified, for example with an audible tone, and given options with respect to handling the incoming call. In addition to typical call waiting options, such as accept or reject the call, the user is provided an option to send a message to the third party caller. In some embodiments, the option to send the message is a one-touch option that sends a message to the third party asking if the call is urgent. The one-touch option generates the message, such that no typing of the message is required on the part of the user. In some embodiments, the incoming call from the third party caller is intercepted by a service provider system before the call reaches the user. The service provider system sends a message to the third party caller asking if the call is urgent and upon receipt forwards the information to the user.

The user in turn receives a response. The third party user is provided a one-touch option, for example "Urgent" or "Not Urgent" to indicate whether the message is urgent or not. If the third party user uses the one-touch option, a message is auto-generated indicated the third party's response. In some embodiments, the third party user may also be provided an option to enter a message with additional details, e.g., a short message service (SMS) or multimedia messaging service (MMS) message. If the third party caller responded with the auto-generated message, the message is displayed to the user. If the response is received from the service provider system that intercepted the incoming caller, the message received from the service provider system is displayed to the user. However, if the message received from the third party caller is an SMS or MMS message, the message is received by a messaging application. In such case, the message is intercepted and it is determined if the incoming message is from the third party (as other incoming messages may be received during the call). If the caller ID of the message matches the caller ID of the third party, the message is displayed for example, in a pop-up window. If an incoming message is received that has a caller ID that does not match the caller ID of the third party, the message is released back to the messaging application.

Once the message is displayed, the user may select an option to accept the call or call the third party back after the current call is complete. If the user selects the option to call the third party back after the current call is complete, a message is auto-generated indicating that the call will be returned. The message is sent to a service provider and forwarded to the third party. Callback information is also stored on the service provider server, such that upon call termination, the service provider automatically initiates a call with the user. If the user accepts the call initiated by the service provider, the service provider then connects the call to the third party.

In some embodiments, when a user is on the call with another party, incoming messages (e.g., SMS or MMS messages) may be received on the device of the user. Most messages are not relevant to the user during the call and need not interrupt the user. However, some messages may be from a person with whom the caller is speaking and are meant to be viewed during the call. As such, in the current embodiment, the caller ID of the sender of the message is extracted from the incoming message. If the caller ID matches a person with whom the user is speaking, the message is displayed for example, in a pop-up window on the user's display. If the caller ID does not match that of someone with whom the user is speaking, the message is released and processed normally through a messaging application on the user's device. In some embodiments, the service provider system intercepts the incoming message. If the message is determined to be from a person with whom the user is speaking, the service provider system may send the message as a data message in-band, which is displayed to the user.

Although the present disclosure describes embodiments where an incoming call is from a third party caller while a call is in-progress, those skilled in the art will understand that embodiments of the present invention may include intercepting all incoming calls, calls from specific callers, and the like, and requesting information regarding the urgency of the call regardless of whether a user has another call in-progress.

Some portions of the detailed description which follow are presented in terms of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Some exemplary embodiments described below are with respect to a mobile Voice over Internet Protocol (VOIP) telecommunication app. However, one skilled in the art will readily recognize from the following description that any native application may be used in embodiments consistent with the present invention without departing from the principles of the disclosure described herein.

In the following description, the terms VOIP system, VOIP telephony system, IP system and IP telephony system are all intended to refer to a system that connects callers and that delivers data, text and video communications using Internet protocol data communications. Those of ordinary skill in the art will recognize that embodiments of the present invention are not limited to use with IP telephony systems and may also be used in other systems.

As illustrated in FIG. 1, a communications environment 100 is provided to facilitate IP enhanced communications. An IP telephony system 120 enables connection of telephone calls between its own customers and other parties via data communications that pass over a data network 110. The data network 110 is commonly the Internet, although the IP telephony system 120 may also make use of private data networks. The IP telephony system 120 is connected to the Internet 110. In addition, the IP telephony system 120 is connected to a publicly switched telephone network (PSTN) 130 via a gateway 122. The PSTN 130 may also be directly coupled to the Internet 110 through one of its own internal gateways (not shown). Thus, communications may pass back and forth between the IP telephony system 120 and the PSTN 130 through the Internet 110 via a gateway maintained within the PSTN 130.

The gateway 122 allows users and devices that are connected to the PSTN 130 to connect with users and devices that are reachable through the IP telephony system 120, and vice versa. In some instances, the gateway 122 would be a part of the IP telephony system 120. In other instances, the gateway 122 could be maintained by a third party.

Customers of the IP telephony system 120 can place and receive telephone calls using an IP telephone 108 that is connected to the Internet 110. Such an IP telephone 108 could be connected to an Internet service provider via a wired connection or via a wireless router. In some instances, the IP telephone 108 could utilize a packet-switched network of a cellular telephone system to access the Internet 110.

Alternatively, a customer could utilize an analog telephone 102 which is connected to the Internet 110 via a telephone adapter 104. The telephone adapter 104 converts analog signals from the telephone 102 into data signals that pass over the Internet 110, and vice versa. Analog telephone devices include but are not limited to standard telephones and document imaging devices such as facsimile machines. A configuration using a telephone adapter 104 is common where the analog telephone 102 is located in a residence or business. Other configurations are also possible where multiple analog telephones share access through the same IP adaptor. In those situations, all analog telephones could share the same telephone number, or multiple communication lines (e.g., additional telephone numbers) may provisioned by the IP telephony system 120.

In addition, a customer could utilize a soft-phone client running on a computer 106 or a television 109 to place and receive IP based telephone calls, and to access other IP telephony systems (not shown). The computer 106 may be a personal computer (PC), a tablet device, a gaming system, and the like. In some instances, the soft-phone client could be assigned its own telephone number. In other instances, the soft-phone client could be associated with a telephone number that is also assigned to an IP telephone 108, or to a telephone adaptor 104 that is connected to one or more analog telephones 102.

Users of the IP telephony system 120 are able to access the service from virtually any location where they can connect to the Internet 110. Thus, a customer could register with an IP telephony system provider in the U.S., and that customer could then use an IP telephone 108 located in a country outside the U.S. to access the services. Likewise, the customer could also utilize a computer outside the U.S. that is running a soft-phone client to access the IP telephony system 120.

A third party using an analog telephone 132 which is connected to the PSTN 130 may call a customer of the IP telephony system 120. In this instance, the call is initially connected from the analog telephone 132 to the PSTN 130, and then from the PSTN 130, through the gateway 122 to the IP telephony system 120. The IP telephony system 120 then routes the call to the customer's IP telephony device. A third party using a cellular telephone 134 could also place a call to an IP telephony system customer, and the connection would be established in a similar manner, although the first link would involve communications between the cellular telephone 134 and a cellular telephone network. For purposes of this explanation, the cellular telephone network is considered part of the PSTN 130.

In the following description, references will be made to an "IP telephony device." This term is used to refer to any type of device which is capable of interacting with an IP telephony system to complete an audio or video telephone call or to send and receive text messages, and other forms of communications. An IP telephony device could be an IP telephone, a computer running IP telephony software, a telephone adapter which is itself connected to a normal analog telephone, or some other type of device capable of communicating via data packets. An IP telephony device could also be a cellular telephone or a portable computing device that runs a software application that enables the device to act as an IP telephone. Thus, a single device might be capable of operating as both a cellular telephone that can facilitate voice based session calls, and an IP telephone that can facilitate data based session calls.

The following description will also refer to a mobile telephony device. The term "mobile telephony device" is intended to encompass multiple different types of devices. In some instances, a mobile telephony device could be a cellular telephone. In other instances, a mobile telephony device may be a mobile computing device, such as the APPLE IPHONE, that includes both cellular telephone capabilities and a wireless data transceiver that can establish a wireless data connection to a data network. Such a mobile computing device could run appropriate application software to conduct VoIP telephone calls via a wireless data connection. Thus, a mobile computing device, such as an APPLE IPHONE, a RIM BLACKBERRY or a comparable device running GOOGLE ANDROID operating system could be a mobile telephony device.

In still other instances, a mobile telephony device may be a device that is not traditionally used as a telephony device, but which includes a wireless data transceiver that can establish a wireless data connection to a data network. Examples of such devices include the APPLE IPOD TOUCH and the IPAD. Such a device may act as a mobile telephony device once it is configured with appropriate application software.

FIG. 1 illustrates that a mobile computing device with cellular capabilities $136_A$ (e.g., a smartphone) is capable of establishing a first wireless data connection A with a first wireless access point 140, such as a wireless local area network (WLAN) based on the Institute of Electrical and Electronics Engineers' (IEEE) 802.11 and 802.13 standards router. The first wireless access point 140 is coupled to the Internet 110. Thus, the mobile computing device $136_A$ can establish a VOIP telephone call with the IP telephony system 120 via a path through the Internet 110 and the first wireless access point 140.

FIG. 1 also illustrates that the mobile computing device $136_A$ can establish a second wireless data connection B with a second wireless access point 142 that is also coupled to the Internet 110. Further, the mobile computing device $136_A$ can establish either a third wireless data connection C via a packet-switch network provided by a cellular service provider 130 using its cellular telephone capabilities, or establish a voice based session telephone call via a circuit-switched network provided by a cellular service provider 130. The mobile computing device $136_A$ could also establish a VoIP telephone call with the IP telephony system 120 via the second wireless connection B or the third wireless connection C.

Although not illustrated in FIG. 1, the mobile computing device $136_A$ may be capable of establishing a wireless data connection to a data network, such as the Internet 110, via alternate means. For example, the mobile computing device $136_A$ might link to some other type of wireless interface using an alternate communication protocol, such as the wireless local area network (WLAN) based on the Institute of Electrical and Electronics Engineers' (IEEE) 802.11 and 802.13 standards.

Similarly, mobile computing device with cellular capabilities $136_B$ may also be coupled to internet 110 and/or cellular service provider 130. In some embodiments, mobile computing device $136_B$ may be connected to internet 110 via a wireless local area network (WLAN) based on the Institute of Electrical and Electronics Engineers' (IEEE) 802.11 and 802.13 standards connection, and the like, and can also establish a VOIP telephone call with the IP telephony system 120 similar to mobile computing device $136_A$. In embodiments of the present invention, communications environment 100 may be used to establish voice based or data based telecommunications sessions between mobile computing device $136_A$ and mobile computing device $136_B$, depending on various criteria associated with each of the mobile computing devices, as will be described below in more detail.

In the embodiments described above, a device may act as a mobile telephony device once it is configured with appropriate application software that may be downloaded from an app distribution platform 144. For example, mobile computing device $136_A$ may download a VOIP mobile app from app distribution platform 144 and install the VOIP mobile app locally making the app a native application running on mobile computing device $136_A$.

FIGS. 2A-2D illustrate graphical user interfaces for providing informative incoming call alerts, according to one or more embodiments. In some embodiments, as shown in FIGS. 2A-2D, user devices 202, 204 (such as, for example, mobile computing devices $136_A$, $136_B$) may exchange messages via mobile applications installed on each device to assist the user of user device 202 in deciding whether to accept an incoming call from a third party of user device 204.

FIG. 2A depicts user device 202 during a telecommunication session using a mobile application. In some embodiments, the mobile application may be a standalone over-the-top (OTT) application installed on device 202, or a feature/module of an OTT telecommunication app that supports call-waiting (e.g., a VoIP mobile telecommunication app). The device 202 includes a display 206. In the present example, the user of device 202, Alice, is on a call with Bob. The display 206 of the device 202 indicates the caller ID 208 of the person with whom the user is speaking, in the present example, Bob. The display 206 also indicates by message 210, that a call is incoming on device 202. In some embodiments, an audible message or tone may be played to alert the user of device 202 of the incoming call in addition to the message 210 displayed on the display 206. In the present example, the message 210 indicates there is an "Incoming Call From Eve". Options 212 are provided, allowing a user to put the current call on hold and answer the incoming call, end the current call and answer the incoming call, text a message to the incoming caller, or decline the incoming call. In some embodiments of the present invention, an option 214 is provided that sends a message to the incoming caller asking if the call is urgent. In addition, an option 216 is provided that requests an automatic call back to the incoming caller when the current call is complete. In the present example, Alice is speaking with Bob on device 202 when a call comes in from Eve. Alice selects option 214 with a single tap on option 214, which sends a message to user device 204 asking if the incoming call is urgent. The message is transmitted by the mobile application via a network to a service provider's server, which in turn, forwards the message to the user device 204.

It is generally understood in the art that forwarding a message, for example, may include generating and sending a new message based on the received message and not literally forwarding the exact message received. In some embodiments, the message may use a proprietary messaging protocol, such as a Session Initiation Protocol (SIP) message, or use a standard protocol, such as an Extensible Messaging and Presence Protocol (XMPP) message. The details and functionality of SIP can be found in the Internet Engineering Task Force (IETF) Request for Comments (RFC) Paper No. 3261 entitled, "SIP: Session Initiation Protocol," that is herein incorporated in its entirety by reference. In some embodiments, the message may be an SMS or MMS message. In some embodiments, a dual-tone multi-frequency (DTMF) tone (e.g., such as a DTMF-A, DTMF-B, DTMF-C, DTMF-D tone) may be generated and sent to the service provider's server. The service provider's server detects the DTMF tone and processes an action associated with the DTMF tone accordingly.

FIG. 2B depicts user device 204 after receiving the message from user device 202. The display 205 of user device 204 shows the caller ID 208. Also displayed is a question 218 to the third party questioning whether the call is urgent. The user of device 204 may choose from responses 220. In some embodiments, the user of device 204 may also be provided an option 221 to enter a message, such as an SMS or MMS message. In the present example, Eve, responds "No", indicating that the call is not urgent. As described above, the message is transmitted by the mobile application via a network to a service provider's server, which in turn, forwards the message to the user device 202.

FIG. 2C depicts user device 202 after receiving the message sent from user device 204. The message is parsed by the mobile application and upon determining that the message indicates that the call is not urgent, a message 222 is displayed on device 202. The message 222 in the present example indicates that Eve responded that the call is not urgent. With the information, the user of device 202, in the present example, Alice can make an educated decision and select option 216, "Call Back on Hangup". The message is sent to the service provider's server. The service provider's server maintains a database of on-going calls that are monitored, such that upon completion, an automatic call back to the third party caller is triggered. The service provider's server also forwards the message that the user will call back on hangup to the user device 204.

FIG. 2D depicts user device 204 after receiving the message from user device 202. The message 224 is displayed indicating that the user will return their call upon completion of their current call. When the user of device 202 completes the call, the service provider's server automatically initiates a call with device 202. The call is initiated in order to connect device 202 with the third party caller of device 204. The call will ring on device 202 with the caller ID of the third party caller. If the user of device 202 answers the call, a dial tone sounds as if the user is calling the third party caller. The third party's device 204 will ring with the caller ID of the user of device 202. When the third party answers, the call is connected.

Figure 3:
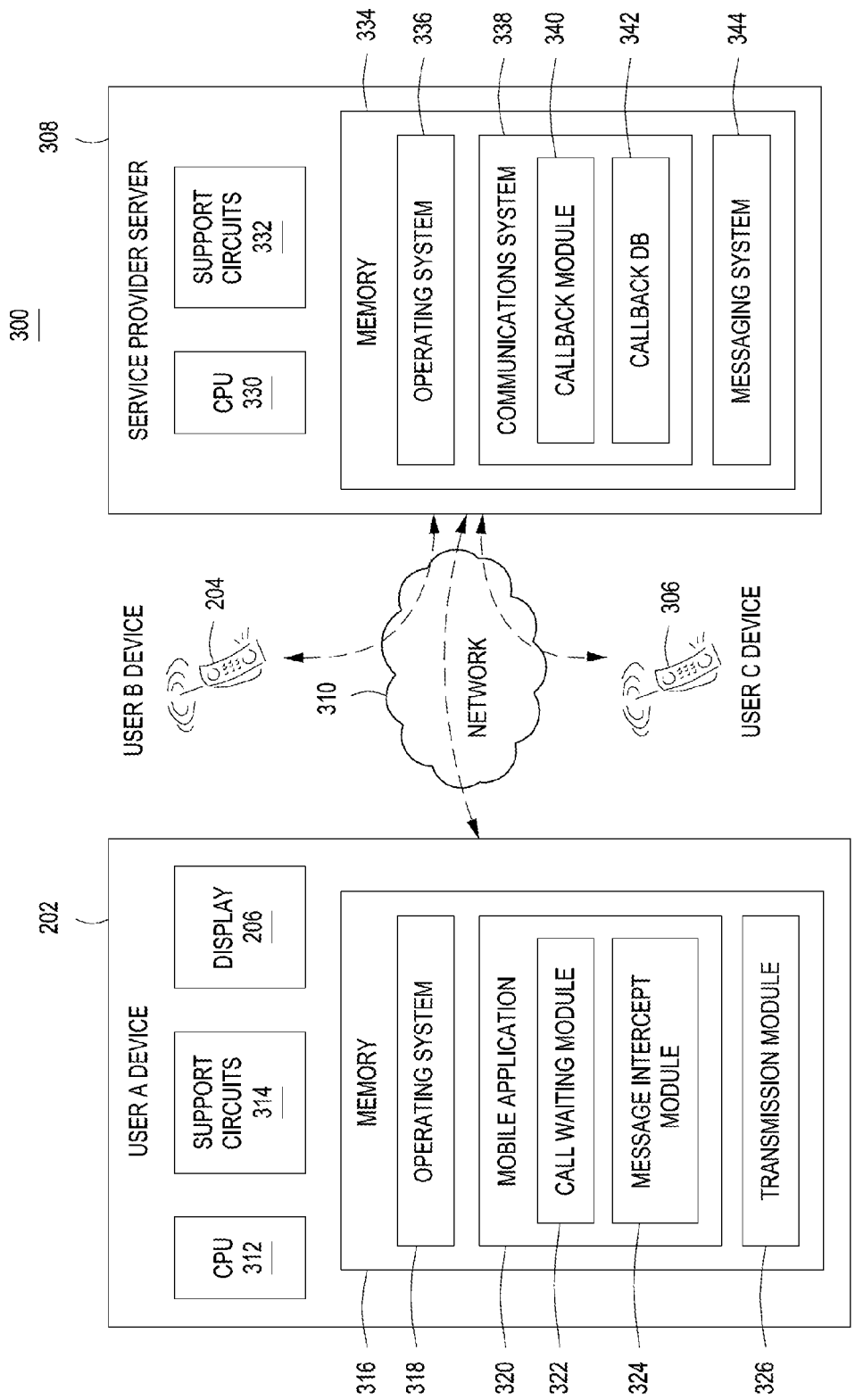
FIG. 3 depicts a block diagram of a system for providing informative incoming call alerts, according to one or more embodiments of the invention.

FIG. 3 depicts a block diagram of a system 300 for providing informative incoming call alerts, according to one or more embodiments. The system 300 includes at least one telecommunication service provider server 308 that can provide telecommunication services to a plurality of end-user devices (e.g., such as User A device 202, User B device 204, and User C device 306) via one or more networks 310. Devices 202, 204, and 306 may include a computer with IP software 106, IP telephone 108, and/or mobile computing device with cellular capabilities 136A, 136B, and the like, as shown in FIG. 1. The telecommunication service provider server 308 may include IP telephone system 120 or PSTN/cellular provider 130.

Each user device (e.g., User A device 202, User B device 204, and User C device 306) comprises a Central Processing Unit (CPU) 312, support circuits 314, a display 206, and a memory 316. The CPU 312 may comprise one or more commercially available microprocessors or microcontrollers that facilitate data processing and storage. The various support circuits 314 facilitate the operation of the CPU 312 and include one or more clock circuits, power supplies, cache, input/output circuits, and the like. The memory 316 comprises at least one of Read Only Memory (ROM), Random Access Memory (RAM), disk drive storage, optical storage, removable storage and/or the like. In some embodiments, the memory 316 comprises an operating system 318, a mobile application 320, and a transmission module 326. The mobile application 320 may include a call waiting module 322 and a message intercept module 324. In some embodiments, the mobile application 320 may be an OTT telecommunication application as described above.

The operating system (OS) 318 generally manages various computer resources (e.g., network resources, file processors, and/or the like). The operating system 318 is configured to execute operations on one or more hardware and/or software modules, such as Network Interface Cards (NICs), hard disks, virtualization layers, firewalls and/or the like. Examples of the operating system 318 may include, but are not limited to, LINUX, MAC OSX, BSD, UNIX, MICROSOFT WINDOWS, IOS, ANDROID and the like.

The telecommunication service provider server 308 may include a Central Processing Unit (CPU) 330, support circuits 332, and memory 334. The CPU 330 may comprise one or more commercially available microprocessors or microcontrollers that facilitate data processing and storage. The various support circuits 332 facilitate the operation of the CPU 330 and include one or more clock circuits, power supplies, cache, input/output circuits, and the like. The memory 334 comprises at least one of Read Only Memory (ROM), Random Access Memory (RAM), disk drive storage, optical storage, removable storage and/or the like. The memory 334 includes an operating system 336, a communications system 338, and a messaging system 344. The messaging system 344 may be any system that facilitates the sending and receiving of SMS and MMS messages, OTT messaging app messages, and the like. The communications system 338 may include a callback module 340 and a callback database 342.

The operating system 336 generally manages various computer resources (e.g., network resources, file processors, and/or the like). The operating system 336 is configured to execute operations on one or more hardware and/or software modules, such as Network Interface Cards (NICs), hard disks, virtualization layers, firewalls and/or the like. Examples of the operating system 336 may include, but are not limited to, LINUX, MAC OSX, BSD, UNIX, MICROSOFT WINDOWS, IOS, ANDROID and the like.

The network 310 comprises one or more communication systems that connect computers by wire, cable, fiber optic and/or wireless link facilitated by various types of well-known network elements, such as hubs, switches, routers, and the like. The network 310 may include an Internet Protocol (IP) network 110, a public switched telephone network (PSTN) 130, or other mobile communication networks, and may employ various well-known protocols to communicate information amongst the network resources.

A user of user A device 202 may be on a call with a user of user C device 306. When a third party, for example, a user of user B device 204 calls user A device 202, the call waiting module 322 displays call waiting options on display 206 for the incoming call. The call waiting options include, but are not limited to, an option to ask the third party caller whether the incoming call is urgent, and an option to return the third party's call upon completion of the current call. If the call waiting module 322 receives user input to ask if the call is urgent, the call waiting module 322 generates a message to the third party. The transmission module 326 sends the message to the service provider server 308. The message may be, for example, SIP NOTIFY message that contains the content of the message, for example, "Urgent?". In some embodiments, the content of the message to be displayed may be customized by the user through the settings of the mobile application 320. The messaging system 244 forwards the message to user B device 204. The mobile application 320 on user B device 204 displays the message on display 206 of user B device 204 with options of for example, "Yes" and "No" (e.g., 220 in FIG. 2B). In some embodiments, if the third party caller is off-net, meaning the third party caller (i.e., user B device 204) is not a VoIP device, the service provider server 308 may use interactive voice response (IVR) to interact with the third party user, for example, stating "The other party is asking if your call is urgent. If it is urgent press 1, if it is not urgent press 2". The service provider server 308 intercepts the DTMF response from the third party caller and sends back the correct data message to the user A device 202.

Upon selection of an option, a message is generated and sent to the service provider server 308, which forwards it to user A device 202 using messaging system 344. Upon receipt of the message, the call waiting module 322 displays a message on display 206 indicating the response received from user B device 204, for example, "Not Urgent". If the message is received from the service provider server 308 in response to a DTMF response from an off-net third party, the message is displayed on display 206. In some embodiments, the mobile application 320 on user B device 204 displays an option to enter a text message to be forwarded to user A device 202 via messaging system 344. The text message is intercepted on user A device, if the intercepted message includes a caller ID that matches the caller ID of the user of user B device 204, the message may be displayed in a pop-up window generated by mobile application 320.

Based on the received message, the user of user A device 202 may select an option to call the third party caller back after the current call is complete. Upon selection of the call back option, the call waiting module 322 generates a message indicating that the call will be returned upon completion of the current call. The transmission module 326 sends the message via the network 310 to service provider server 308, which forwards the message for display to user B device 204. In some embodiments, the callback information is stored in callback database 342. Information may include an identifier of the current call that is to be monitored for completion, information regarding user A device 202 as well as the third party caller's device information. The callback module 340 monitors the current call between user A device 202 and user C device 306. When the call between user A device 202 and user C device 306 ends, the callback module 340 initiates a call to user A device 202. A SIP INVITE message is sent to user A device 202 with the caller ID of user B device 204. When the user of user A device 202 answers, the user receives a dial tone as if the user has placed the call to user B device 204. A SIP INVITE message is sent to user B device 204 with the caller ID of user A device 202. If the user of user B device 204 answers, the call is connected. In some embodiments, after the current call is complete, user A device 202 automatically initiates a call to user B device 204.

Although the embodiments describe the call waiting module 322 using SIP messages to communication messages between callers, other message types may be used, for example SMS or MMS. In some embodiments, a DTMF tone (e.g., such as a DTMF-A, DTMF-B, DTMF-C, DTMF-D tone) may be generated and sent to the service provider's server. The service provider's server detects the DTMF tone and processes the action accordingly as described above.

In another embodiment, when user A device 202 is on a call with user C device 306, incoming messages, such as SMS or MMS messages may be received during the call. Incoming messages are typically displayed by a messaging application on user A device 202. However, the user of user C device 306 may send the user of user A device 202 a photo, a hyperlink, a video, or the like that s/he is discussing on the call. In some embodiments, the message intercept module 324 intercepts all incoming messages. The message intercept module 324 parses the message in order to identify the caller ID associated with an incoming message. If the caller ID matches the caller ID of a user with whom the user of user A device 202 is speaking, the message intercept module 324 displays the incoming message in the mobile application 320. In some embodiments, the incoming message may be displayed in a pop-up window generated by the mobile application 320. If the caller ID does not match the caller ID of a user with whom the user of user A device 202 is speaking, the message is released and processed by a messaging application on user A device 202.

Figure 4:
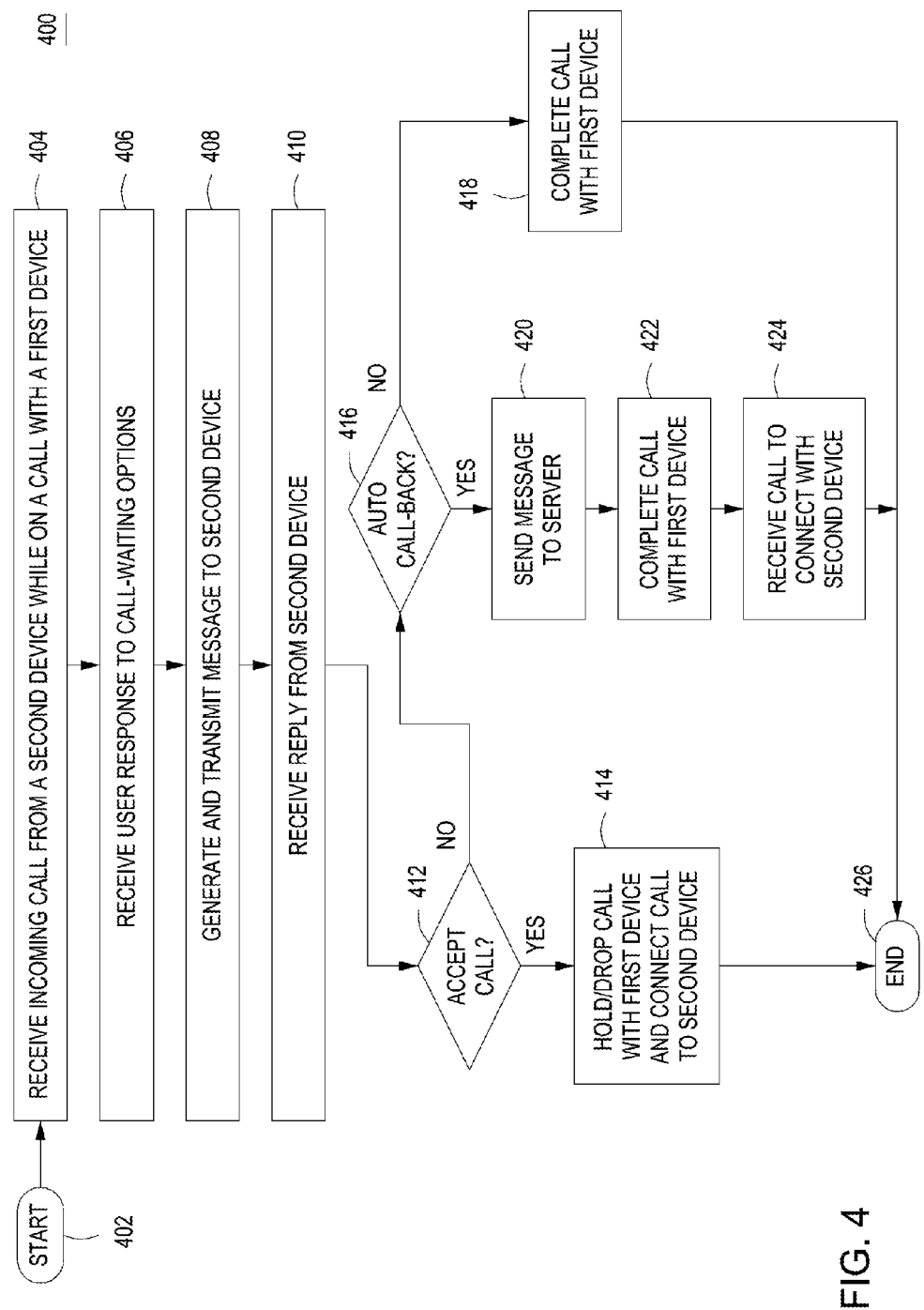
FIG. 4 depicts a flow diagram of a method for providing informative incoming call alerts, according to one or more embodiments of the invention.

FIG. 4 depicts a flow diagram of a method 400 for providing informative incoming call alerts, according to one or more embodiments of the invention. Prior to invoking method 400 a telecommunication session is established with a first user device. The telecommunication session may be a Voice over Internet Protocol (VoIP) call. The telecommunication session may be between a first VoIP device user and a second VoIP device user over an IP network, which may be referred to as an "on-net" call. When either call leg is not a VoIP device user, the call may be referred to as an "off-net" call. The method 400 begins at step 402 and proceeds to step 404.

At step 404, an incoming call is received from a second mobile device. When the incoming call is received, call-waiting options are displayed to the user. The call-waiting options include, but are not limited to an option to request information regarding whether the incoming call is urgent, and an option to automatically callback the incoming caller upon completion of the currently established telecommunication session. In some embodiments, the incoming call is intercepted at a service provider server. The service provider server determines whether the incoming caller is on-net or off-net.

At step 406, a selection of one of the call-waiting options is received. In some embodiments, the user may simply tap on the option without requiring any typing on the part of the user, thereby causing the least disruption of the user's attention to the current call. In some embodiments, the content of the message to be displayed may be customized by the user through the settings of the mobile application 320. For example, a doctor may pre-set a message to read, "911?" In other embodiments, the user may select an option to send a more detailed message to the incoming caller device, by selecting for example, a "Message" button. Before taking any action regarding accepting or ignoring the incoming call, the user may select the option to ask if the incoming call is urgent.

At step 408, a message is automatically generated and transmitted asking if the incoming call is urgent. If the call is an on-net call, the message may be a SIP NOTIFY message that contains the text of the message. The message is transmitted to a service provider server, which forwards the message to the second mobile device. If the call is an off-net call, the message may be a SMS message. In the event that the user chose to send a more detailed message to the incoming caller, the message may be a SMS message or a SIP NOTIFY message that contains the text of the message. In embodiments where the service provider server intercepted the incoming call, if the call is on-net, the service provider server may send a data message to the third-party caller asking if the call is urgent. If the call is off-net, the service provider may send an SMS message to the third party caller. Alternatively, the service provider server may use interactive voice response (IVR) to interact with the third party user, for example, with a message stating, "The other party is asking if your call is urgent. If it is urgent press 1, if it is not urgent press 2". The service provider server intercepts the DTMF response from the third party and sends back the correct data message to the user indicating whether the incoming call is urgent.

At step 410, a reply to the message in received. In some embodiments, an audible tone is sounded to indicate that the message is received. If the call is an on-net call, the message may be a SIP message that is received in the mobile application. The message is parsed to identify whether the reply indicates that the incoming call is urgent. The response is displayed on the user device, for example, "Call urgent" or "Call not urgent". If the call is an off-net call, the incoming messages are monitored and if the message is determined to be from the third party caller, the message is displayed in for example, a pop-up window generated by the mobile application. The user may use this information to determine how to proceed.

At step 412, a user input is received indicating whether the user would like to accept the incoming call. If the user wishes to accept the incoming call, then at step 414, the incoming call is connected. The currently established call with the first mobile device may be place on hold or ended. The incoming call with the second mobile device proceeds to completion at which time the method 400 proceeds to step 426 and ends.

However, if at step 412, the user input indicates the user would not like to accept the incoming call, then at step 416, it is determined whether the user has requested an automatic call back to the second user device upon completion of the current call. If the user does not wish to request an automatic callback, the method 400 proceeds to step 418, where the current call is completed and the method 400 proceeds to step 426 and ends.

However, if at step 416, the user requests an automatic callback to the user of the second mobile device, then at step 420, a message is generated and transmitted to the service provider server indicating a request to setup an automatic callback. The service provider server forwards the message to the second mobile device for display thereby informing the second mobile device user that the call will be returned upon completion of the current call, as described in further detail with respect to FIG. 5 below.

At step 422, the current call is completed. In some embodiments, when the current call is complete, the user device initiates a call to the third party caller. In some embodiments, where the callback to the third party is initiated by a service provider, at step 424, an incoming call is received indicating the user of the second mobile device as the caller identifier. Upon accepting the call, a call is established with the second mobile device. The method 400 ends at step 426.

Figure 5:
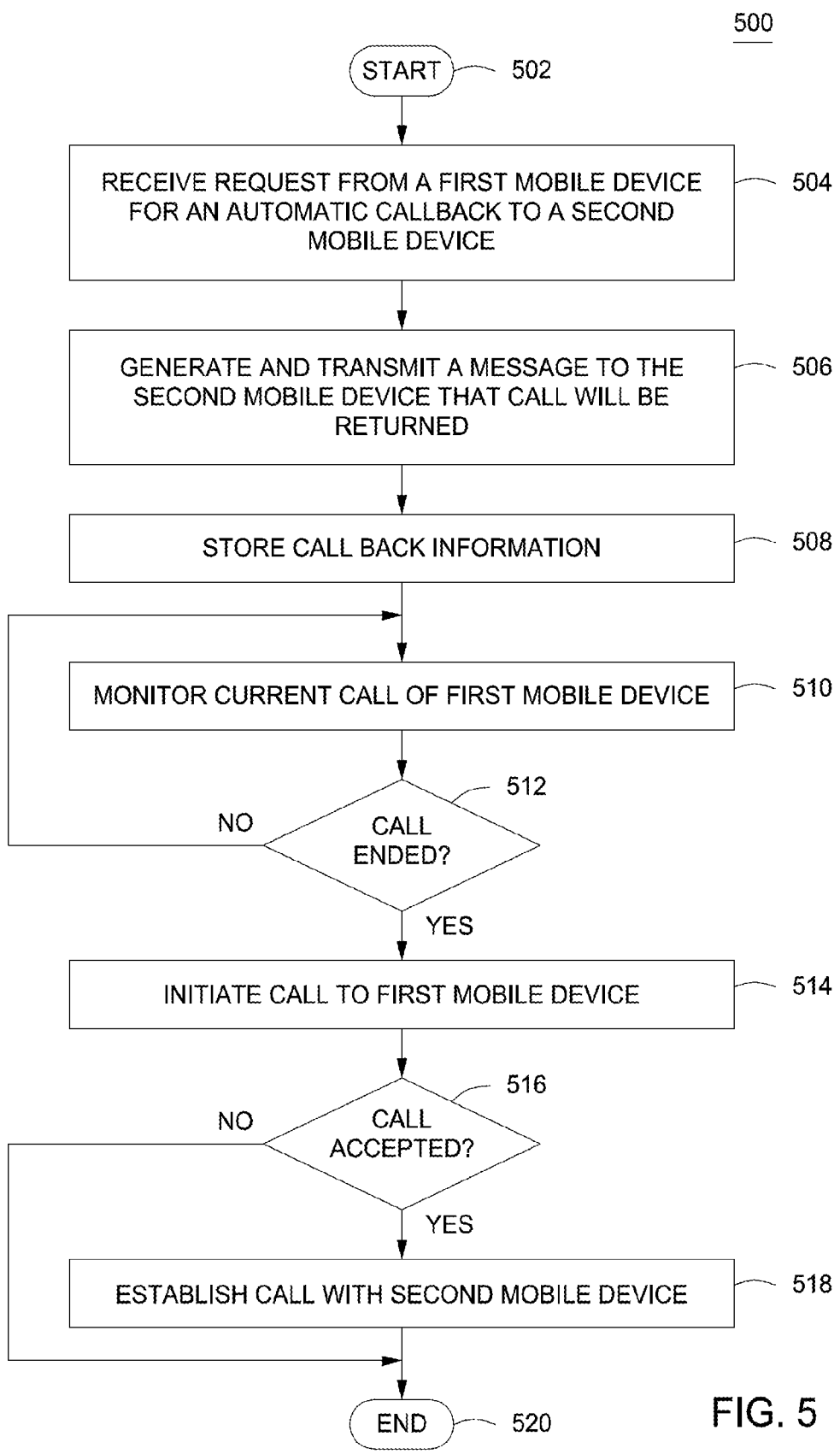
FIG. 5 depicts a flow diagram of a method for automatic callbacks, according to one or more embodiments of the invention.

FIG. 5 depicts a flow diagram of method 500 for automatic callbacks, according to one or more embodiments of the invention. The method 500 is performed by a service provider server. The method 500 starts at step 502 and proceeds to step 504.

At step 504, a request is received from a first mobile device for an automatic callback to a second mobile device. The callback request is a call-waiting option provided to a user when an incoming call is received from a third party while the user is engaged in a telecommunication session with another caller.

At step 506, a message is generated and transmitted to the second mobile device indicating that the call will be returned upon completion of the current call. The message may be a SIP NOTIFY message. If the call is an off-net call, the message may be an SMS message as described above.

At step 508, the request is stored in a callback database. Information needed for the callback is stored including, but not limited to the device information from where the request was received (i.e., the first mobile device) and the device information of the second mobile device.

At step 510, the current call in which the user is engaged is monitored. The server monitors the current call to determine when the call has ended. At step 512, it is determined whether the current call has ended. If the call has not ended, the method proceeds to step 510 and iterates until at step 512 it is determined that the current call has ended at which time the method 500 proceeds to step 514.

At step 514, the server initiates a call to the first mobile device. The call may be a SIP INVITE message or a PUSH notification using the caller ID of the second user device. When the user of the first mobile device answers, s/he receives a dial tone generated, for example, with interactive voice response (IVR). At step 516, it is determined whether the call was accepted. If the call was not accepted, the method 500 proceeds to step 520 and ends. However, if at step 516 the call is accepted on the second user device, then at step 518, the call is established with the second user device. The method 500 ends at step 520.

Figure 6:
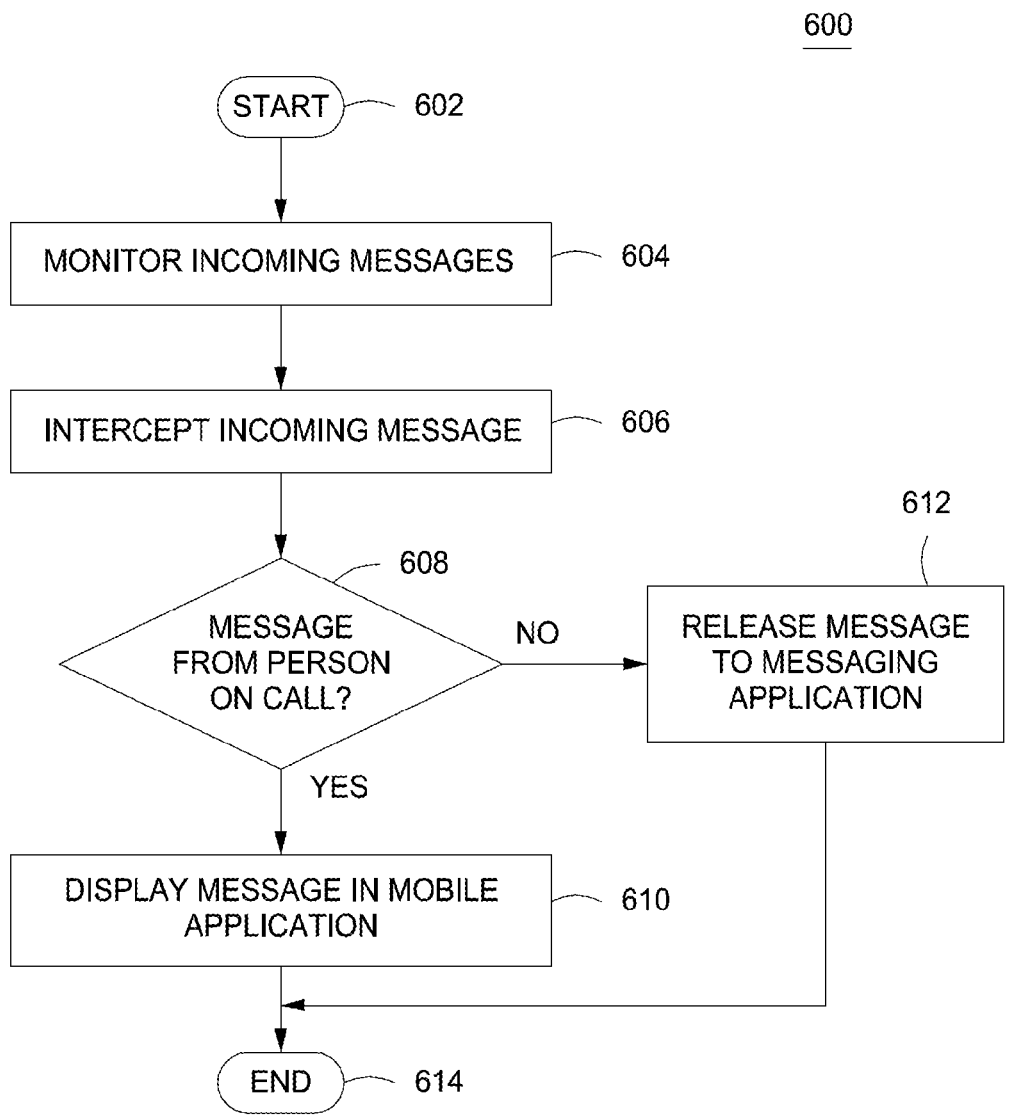
FIG. 6 depicts a flow diagram of a method for displaying incoming messages from people with whom a user is speaking, according to one or more embodiments of the present invention.

FIG. 6 depicts a flow diagram of a method 600 for displaying incoming messages from people with whom a user is speaking, according to one or more embodiments of the present invention. Prior to invoking the method 600, a call is established with a first mobile device. The method 600 starts at step 602 and proceeds to step 604.

At step 604, a message application is monitored for incoming messages. The message application may be part of an over-the-top telecommunication or a native messaging application. The message may be a SMS or MMS message, an email message, or any type of message. For example, the message may be a link to a website, a phone number, an address, a contact, an image, or the like. Listener programs, such as, SMS Listener for ANDROID, may be utilized to monitor incoming messages.

At step 606, an incoming message is intercepted. The message may include a message identifier as well as the content of the incoming message. The identifier is extracted from the incoming message.

At step 608, it is determined whether the incoming message is from a person with whom the user is speaking (i.e., a callee). The message identifier is compared to the user identifier of the person (or persons) with whom the user is speaking. The message identifier may also be compared to contact information (e.g., phone number, email address, home address) extracted from an address book on the user device. If the message identifier does not correspond to the caller identifier of a callee, then at step 612, the message is released back to the messaging application of the mobile device. However, if the message identifier corresponds to an identifier of a callee, then at step 610, the message is displayed in the mobile application of the user device. The user may then interact with the displayed message by, for example, clicking on a link, expanding an image, copying content, and the like. The message is also accessible via the messaging application, thereby providing access to the user at a later time. Additionally, the user may send a message back to the callee by selecting, for example, a button within the mobile application that opens a message option modally on the mobile application and enables sending content via SMS, MMS, or other data protocol, as described above. The method 600 ends at step 614.

Figure 7:
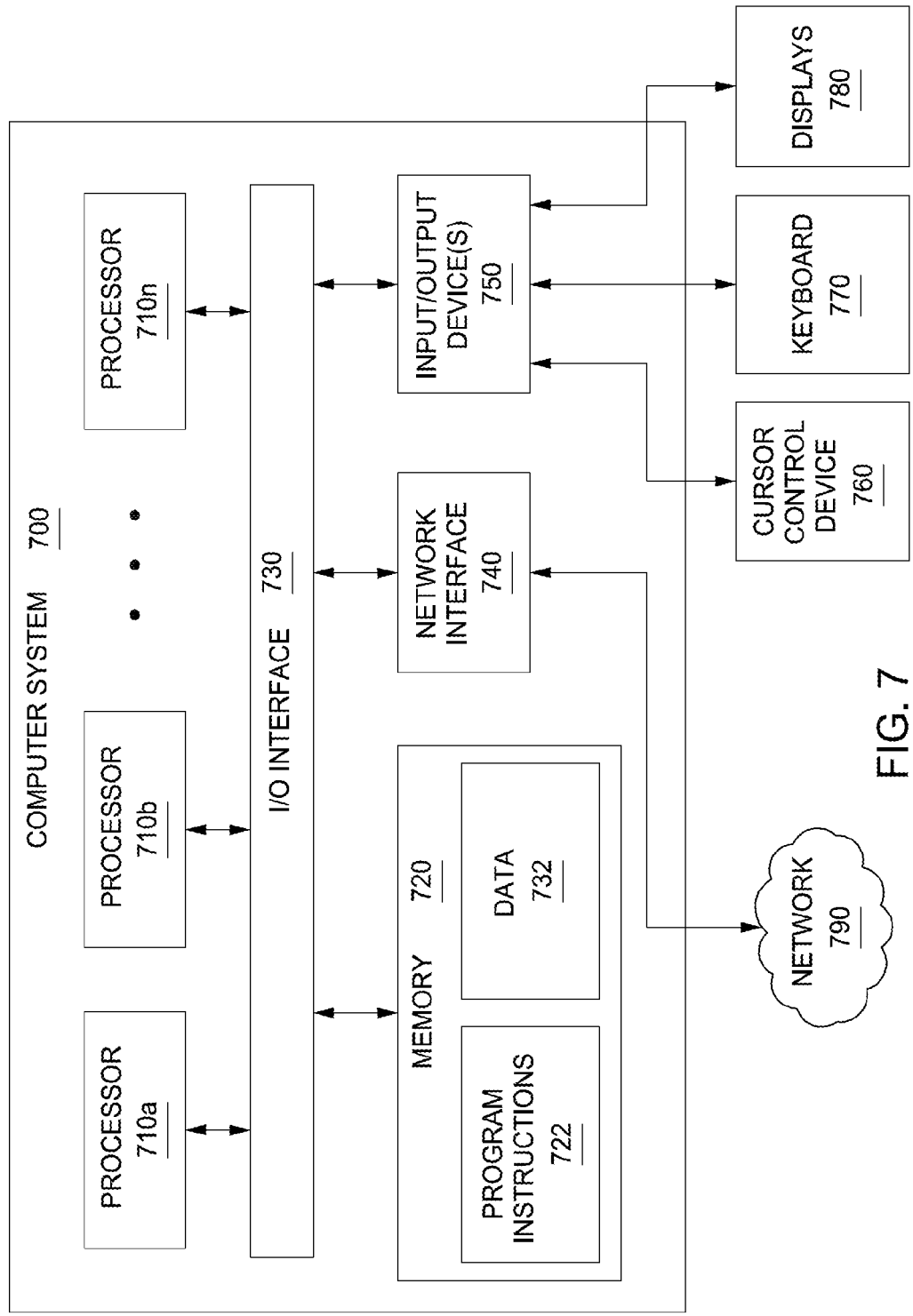
FIG. 7 depicts a computer system that can be utilized in various embodiments of the present invention to implement the computer and/or the display, according to one or more embodiments of the invention.

FIG. 7 depicts a computer system 700 that can be utilized in various embodiments of the present invention to implement the computer and/or the display, according to one or more embodiments.

Various embodiments of method and apparatus for organizing, displaying and accessing contacts in a contact list, as described herein, may be executed on one or more computer systems, which may interact with various other devices. One such computer system is computer system 700 illustrated by FIG. 7, which may in various embodiments implement any of the elements or functionality illustrated in FIGS. 1-6. In various embodiments, computer system 700 may be configured to implement methods described above. The computer system 700 may be used to implement any other system, device, element, functionality or method of the above-described embodiments. In the illustrated embodiments, computer system 700 may be configured to implement the method 400 as processor-executable executable program instructions 722 (e.g., program instructions executable by processor(s) 710) in various embodiments.

In the illustrated embodiment, computer system 700 includes one or more processors 710a-710n coupled to a system memory 720 via an input/output (I/O) interface 730. Computer system 700 further includes a network interface 740 coupled to I/O interface 730, and one or more input/output devices 750, such as cursor control device 760, keyboard 770, and display(s) 780. In various embodiments, any of the components may be utilized by the system to receive user input described above. In various embodiments, a user interface may be generated and displayed on display 780. In some cases, it is contemplated that embodiments may be implemented using a single instance of computer system 700, while in other embodiments multiple such systems, or multiple nodes making up computer system 700, may be configured to host different portions or instances of various embodiments. For example, in one embodiment some elements may be implemented via one or more nodes of computer system 700 that are distinct from those nodes implementing other elements. In another example, multiple nodes may implement computer system 700 in a distributed manner.

In different embodiments, computer system 700 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments processors 710 may be general-purpose or embedded processors implementing any of a variety of instruction set architectures (ISAs). In multiprocessor systems, each of processors 710 may commonly, but not necessarily, implement the same ISA.

System memory 720 may be configured to store program instructions 722 and/or data 732 accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 720. In other embodiments, program instructions and/or data may be received, sent or stored upon different types of computer-accessible media or on similar media separate from system memory 720 or computer system 700.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices attached to a network (e.g., network 790), such as one or more external systems or between nodes of computer system 700. In various embodiments, network 790 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 740 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or accessing data by one or more computer systems 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

In some embodiments, the illustrated computer system may implement any of the operations and methods described above, such as the operations described with respect to FIG. 3 and the methods illustrated by the flowchart of FIGS. 4, 5, and 6. In other embodiments, different elements and data may be included.

Those skilled in the art will appreciate that computer system 700 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer-implemented method for providing informative incoming call alerts, comprising:
   receiving an incoming call from a second device;
   transmitting, to the second device, a first message regarding the incoming call;
   receiving, from the second device, a second message responsive to the first message regarding the incoming call;
   receiving a selection of one of a plurality of options based on the received second message;
   processing the selected option;
   receiving a selection of an option to request an automatic call back to the second device after a telecommunication session with a first device has ended;

transmitting a message directed to the second device indicating that the incoming call will be returned upon completion of the telecommunication session with the first device;
terminating the telecommunication session with the first device; and
receiving a call request to establish a telecommunication session with the second device.

2. The method of claim 1, wherein the incoming call is received from the second device during a telecommunication session established with the first device.

3. The method of claim 2, wherein the telecommunication session is a Voice over Internet Protocol (VoIP) telecommunication session.

4. The method of claim 1, wherein the first message is a request regarding the urgency of the incoming call, and the second message is a reply regarding the urgency of the incoming call.

5. The method of claim 1, wherein the first message is an interactive voice response (IVR) message.

6. The method of claim 1, wherein one option of the plurality of options comprises sending the incoming caller one of an auto-generated Session Initiation Protocol (SIP) message comprising pre-defined text or a short message service (SMS) or multimedia messaging service (MMS) message comprising user specified text.

7. The method of claim 1, wherein the second message regarding the incoming call is a Session Initiation Protocol (SIP) message.

8. The method of claim 1, wherein the second message regarding the incoming call is based on a dual-tone multi-frequency (DTMF) tone response.

9. A system for providing informative incoming call alerts, comprising:
a) at least one processor;
b) at least one input device; and
c) at least one storage device storing processor-executable instructions which, when executed by the at least one processor, perform a method including:
receiving an incoming call from a second device;
transmitting, to the second device, a first message regarding the incoming call;
receiving, from the second device, a second message responsive to the first message regarding the incoming call;
receiving a selection of one of a plurality of options based on the received second message; and
processing the selected option;
receiving a selection of an option to request an automatic call back to the second device after a telecommunication session with a first device has ended;
transmitting a message directed to the second device indicating that the incoming call will be returned upon completion of the telecommunication session with the first device;
terminating the telecommunication session with the first device; and
receiving a call request to establish a telecommunication session with the second device.

10. The system of claim 9, wherein the incoming call is received from the second device during a telecommunication session established with the first device.

11. The system of claim 9, wherein the first message is a request regarding the urgency of the incoming call, and the second message is a reply regarding the urgency of the incoming call.

12. The system of claim 9, wherein the first message is an interactive voice response (IVR) message.

13. The system of claim 9, wherein the second message regarding the incoming call is based on a dual-tone multi-frequency (DTMF) tone response.

14. A computer-implemented method for displaying incoming messages received during a telecommunication session, comprising:
intercepting an incoming message;
extracting a message identifier from the incoming message; and
displaying the incoming message when it is determined that the message identifier from the incoming message is associated with a caller identifier of a user taking part in the telecommunication session.

15. The method of claim 14, wherein the incoming message is one of a short message service (SMS), multimedia messaging service (MMS) messages, or email message.

16. The method of claim 14, wherein the message identifier is compared to contact information extracted from an address book.

17. The method of claim 14, wherein the incoming message is displayed in a user interface of a telecommunication application that is processing the telecommunication session, and wherein the telecommunication application is a Voice over Internet Protocol (VoIP) telecommunication application.

* * * * *